(12) United States Patent
Hokoi

(10) Patent No.: US 7,023,591 B2
(45) Date of Patent: Apr. 4, 2006

(54) IMAGE SCANNING APPARATUS, STORAGE MEDIUM FOR STORING CONTROLLING PROCEDURE OF IMAGE SCANNING APPARATUS, AND CONTROL PROGRAM FOR IMAGE SCANNING APPARATUS

(75) Inventor: Hayato Hokoi, Sakura (JP)

(73) Assignee: Nikon Corporation, Tokyo (JP)

( * ) Notice: Subject to any disclaimer, the term of this patent is extended or adjusted under 35 U.S.C. 154(b) by 930 days.

(21) Appl. No.: 09/990,296

(22) Filed: Nov. 23, 2001

(65) Prior Publication Data

US 2002/0030837 A1    Mar. 14, 2002

Related U.S. Application Data

(63) Continuation-in-part of application No. 09/908,587, filed on Jul. 20, 2001.

(30) Foreign Application Priority Data

Jul. 24, 2000   (JP)   .............................. 2000-222255
Dec. 1, 2000   (JP)   .............................. 2000-366625

(51) Int. Cl.
*H04N 1/46*   (2006.01)
*H04N 1/04*   (2006.01)

(52) U.S. Cl. ...................... 358/506; 358/513; 358/514; 358/505; 358/509; 358/483; 358/482; 358/474; 358/496; 358/445

(58) Field of Classification Search ................ 358/483, 358/482, 486, 488, 512–514, 509, 487, 506, 358/496, 505, 474, 497, 475, 445, 494; 250/208.1, 250/234–236; 355/50, 53, 41; 399/211–213, 399/206; 382/312, 318, 319
See application file for complete search history.

(56) References Cited

U.S. PATENT DOCUMENTS

| | | | |
|---|---|---|---|
| 5,550,651 A | 8/1996 | Terajima | 358/496 |
| 5,903,363 A | 5/1999 | Yaguchi et al. | 358/474 |
| 6,608,301 B1 | 8/2003 | Liu et al. | 250/234 |
| 6,667,818 B1 | 12/2003 | Kuo | 358/514 |

*Primary Examiner*—Cheukfan Lee
(74) *Attorney, Agent, or Firm*—Oliff & Berridge PLC

(57) ABSTRACT

It is assumed that there are a plurality of areas where a transfer is to be performed at a long pitch, in an original film, and a plurality of areas where a transfer is to be performed at a short pitch in each of the areas where a transfer is to be performed at a long pitch. On a sub-scan stage the original document is sub-scanned in the area where a transfer is to be performed at a short pitch, by performing at least one small step transferring, which is a transfer performed at a short pitch. Thereafter, a large step transferring which is a transfer performed at a long pitch, is performed on the sub-scan stage. The sub-scanning is repeated by performing the large step transferring and the small step transferring.

19 Claims, 14 Drawing Sheets

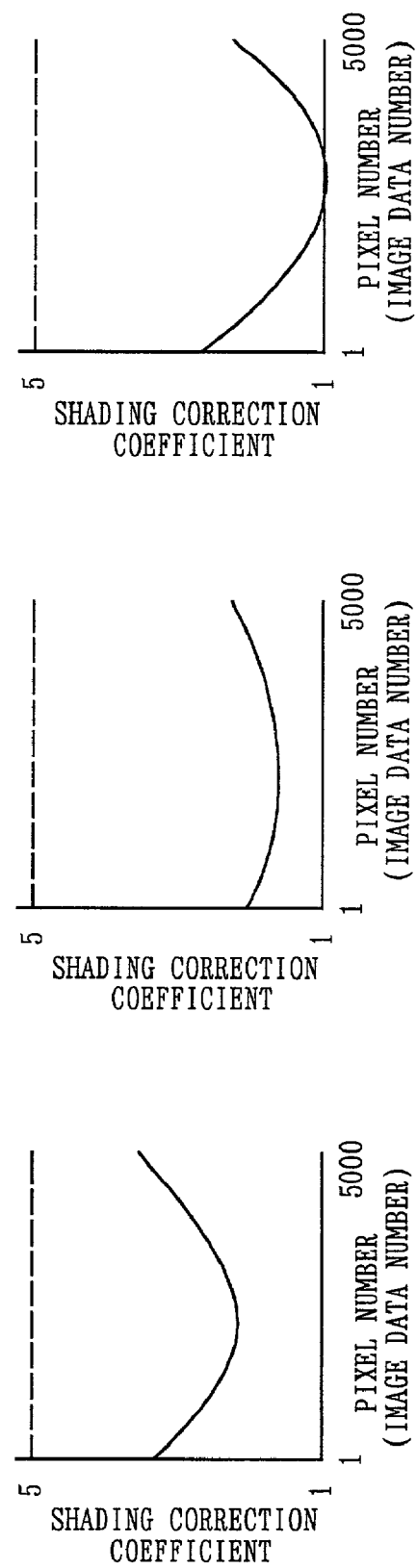

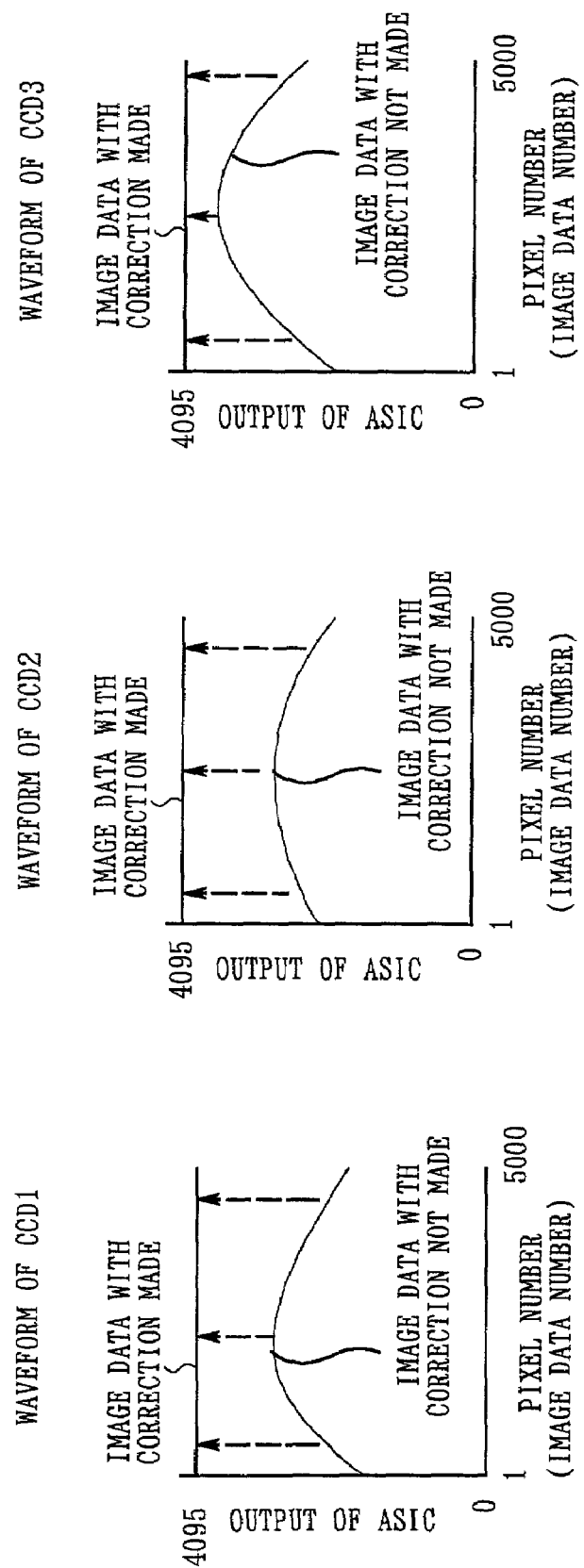

IMAGE SCANNING APPARATUS, STORAGE MEDIUM FOR STORING CONTROLLING PROCEDURE OF IMAGE SCANNING APPARATUS, AND CONTROL PROGRAM FOR IMAGE SCANNING APPARATUS

CROSS REFERENCE TO RELATED APPLICATION

This is a Continuation-in-Part of application Ser. No. 09/908,587 filed Jul. 20, 2001. The entire disclosure of the prior application(s) is hereby incorporated by reference herein in its entirety.

BACKGROUND OF THE INVENTION

1. Field of the Invention

The present invention relates to an image scanning apparatus which comprises a plurality of monochrome line sensors and where color separation illumination is performed. More particularly, the present invention relates to an image scanning apparatus which is preferable for scanning an image in high quality with improvement in image scanning rate and in S/N of a color image scanning signal, and accurately determining white balance in each color and shading correction coefficient, and also relates to a storage medium which stores a controlling procedure of the image scanning apparatus, and a control program for the image scanning apparatus.

2. Description of the Related Art

There are two conventional image scanning apparatuses as follows.

An image scanning apparatus of the first type comprises a monochrome CCD line sensor, where a single line can be scanned at once.

Specifically, a luminous source switches in sequence the color of emitting light in the order of red (R), green (G) and blue (B), and emits lights of R-color, G-color and B-color in sequence onto an original document. Subsequently, the single CCD line sensor outputs in sequence an R-line image data which is scanned by using illumination light of the R-color, a G-line image data which is scanned by using illumination light of the G-color, and a B-line image data which is scanned by using illumination light of the B-color, thereby obtaining a color image scanning signal for one line in a main-scan direction.

Moreover, a sub-scan mechanism transfers a scanning position of the CCD line sensor to an adjacent line, where the R-line image data, G-line image data and B-line image data for the adjacent line are scanned as well. The above operations are repeated to obtain the color image scanning signal.

The second type of the image scanning apparatus uses 3-line color CCD line sensors, where three lines can be scanned at a time.

Specifically, by using the 3-line color CCD line sensors, a white luminous source is allowed to emit light once, whereby the R-line image data, G-line image data and B-line image data can be obtained simultaneously.

The image scanning apparatus using the monochrome CCD line sensor cannot simultaneously accumulate color components of the three colors (R-color, G-color and B-color) as charge in the CCD line sensor. Hence, it is necessary to emit light three times each for the R-color, G-color and B-color, in order to obtain the R-line image data, G-line image data, and B-color image data.

On the other hand, the image scanning apparatus with the 3-line color CCD line sensors can obtain the color image scanning signal by emitting white light only once.

Therefore, an image scanning rate of the image scanning apparatus using the single monochrome CCD line sensor is slower than that of the image scanning apparatus with the 3-line color CCD line sensors. On the other hand, the image scanning apparatus using the single monochrome CCD line sensor realizes an improvement in color reproduction by devising illumination spectral characteristic. However, the illumination area of the image scanning apparatus using the single monochrome CCD line sensor is extremely wide in a sub-scan direction, compared with its light receiving area. As a result, energy used for the illumination is not utilized efficiently, resulting in a waste of energy. Incidentally, it is possible to narrow the area where the light illuminates the original document, in the sub-scan direction. However, expensive components are needed for achieving that, which results in increasing a cost of the image scanning apparatus.

Moreover, when an image is scanned with the image scanning apparatus of the first type, that is, the illumination-switching-type image scanning apparatus using the single monochrome CCD line sensor, differences occur according to the transfer characteristics of the optical system. There is also a lack in uniformity in the sensitivity of the single monochrome CCD line sensor depending on the pixel positions.

Therefore, distortions occur both in distribution of the luminous energy of light which is incident from the original document and of the luminous energy of signals generated by the image scanning apparatus (R line image data, G line image data, B line image data). Unless correction is made to the distribution of the luminous energy of the generated signals by the image scanning apparatus, a phenomenon occurs due to the distortions that luminous energy is large on the central part of the image but small in the periphery of the image, compared to the original document. The conventional image scanning apparatus has shading correction mechanism in order to adjust the distortions in the luminous energy distribution.

Conventional shading correction mechanism will be explained in the following. An image scanning apparatus has, according to its characteristics, a memory for storing in advance a large number of shading correction coefficients which are determined in accordance with each luminescent color of the luminous source and each pixel on the surface of an imaging device (chip). At performing the imaging, a predetermined controlling device reads out a shading correction coefficient from the memory corresponding to a main-scan position, obtains shading-corrected image data by multiplying image data outputted from an imaging apparatus by the shading correction coefficient. Every time the main-scan position varies, the shading correction coefficient read from the memory varies accordingly.

Needless to say, the above shading correction is performed as well in the image scanning apparatus using the single monochrome CCD line sensor and monochrome light.

In the conventional image scanning apparatus using the single monochrome CCD line sensor, the shading correction coefficient is obtained for each pixel for each color, and when the monochrome light is used, for a single color.

However, when the shading correction coefficient is obtained in an image scanning apparatus using a plurality of monochrome CCD line sensors in the same manner as in the image scanning apparatus using a single monochrome CCD line sensor as described above, following problems arise.

That is, when image data in a single monochrome CCD line sensor included in a plurality of monochrome CCD line sensors is employed to obtain the shading correction coefficients by each pixel in the image scanning apparatus using a plurality of monochrome CCD line sensors, only the shading correction coefficient of the single monochrome CCD line sensor can be accurately obtained. However, it is not possible to obtain an accurate shading correction coefficient for the rest of the monochrome CCD line sensors in the plurality of monochrome CCD line sensors because image data of these rest of the line sensors are not taken into consideration.

Therefore, when the amount of light incident from an object into a plurality of monochrome CCD line sensors exceeds the saturation level of these rest of the monochrome CCD line sensors, overflowing charges to the adjacent pixel registers cause a phenomenon where an image is distorted (blooming). In addition, in a case where a white balance determined in a single monochrome CCD line sensor is used, when the levels of electric signals outputted from these rest of the monochrome CCD line sensors exceed the saturation level of a signal processing circuit such as an A/D converter, the image data with shading correction not yet made no longer vary and the relation between the level of the amount of input light and the image data is represented by a non-linear curve. This occurs due to different sensitivities of the CCD line sensors.

It is not possible to obtain an accurate correction result of performing the shading correction processing on the non-linear image data.

In recent years, the image scanning apparatus using a plurality of monochrome CCD line sensors has been in progress of development, and there has been a demand for techniques which realize accurate shading correction in this apparatus.

SUMMARY OF THE INVENTION

It is an object of the present invention to provide an image scanning apparatus which realizes substantial improvement in scanning rate of a color image, a storage medium which stores a controlling procedure of the image scanning apparatus, and a control program for the image scanning apparatus, in an image scanning apparatus which comprises a monochrome CCD line sensor, which can scan one line at a time, and where color separation illumination is performed.

It is another object of the present invention to provide an image scanning apparatus where a color image scanning signal with a high S/N can be obtained, a storage medium which stores a controlling procedure of the image scanning apparatus, and a control program for the image scanning apparatus, in an image scanning apparatus which comprises a plurality of monochrome CCD line sensors, which can scan a plurality of lines at a time, and where color separation illumination is performed.

It is another object of the present invention to determine an exposure time for a white balance in an image scanning apparatus using a plurality of monochrome CCD line sensors by obtaining a maximum value for each illumination color in image data of all pixels in the lines, the maximum value obtained with regard to data at positions where white balance is determined in a main-scanning direction. And further, the object is to provide an image scanning apparatus which realizes obtaining accurate shading correction coefficients of each pixel in each line according to the exposure time, and a storage medium for storing a controlling procedure of the image scanning apparatus, and a control program for the image scanning apparatus.

It is another object of the present invention to provide an image scanning apparatus, a storage medium for storing a controlling procedure, and a control program which enable obtaining a maximum value of the image data, determining the white balance, obtaining accurate shading correction coefficient, and determining optimal exposure time.

The image scanning apparatus according to a first basic mode of the present invention comprises an illuminating device for illuminating an original document, a driving device for: relatively transferring the original document and its image scanning position; assuming a plurality of areas where the transfer is to be performed at a long pitch, and a plurality of areas where the transfer is to be performed at a short pitch, included in each of the areas where the transfer is to be performed at a long pitch, the pitches being long or short in a sub-scan direction of the original document; sub-scanning the original document at least once by executing one small step transferring in the area where the transfer is to be performed at a short pitch and then sub-scanning the original document by performing a large step transferring, the small step transferring being the transfer performed at a short pitch, the large step transferring being the transfer performed at a long pitch; and repeating the sub-scanning by performing the large step transferring and the small step transferring, and an imaging device having at least two or more line sensors on its surface with predetermined equal line intervals, for outputting a plurality of image data from each of the line sensors, the line sensors receiving light from the original document in a plurality of pixels, the image data representing received light intensity by each of the plurality of pixels.

In the image scanning apparatus, the imaging device composed of at least two or more line sensors, performs main-scanning at least once in the area with the transfer is to be performed at a short pitch and then performs the large step transferring, and repeats the scanning by performing the large step transferring and the small step transferring. Hence, the two or more line sensors are used to simultaneously expose document positions for the plurality of lines for the same exposure time, so that the color image can be scanned at high speed without deteriorating the S/N.

Moreover, an increase in the number of line sensors enables illuminating many line sensors, thereby improving energy efficiency in illumination.

According to another mode of the image scanning apparatus of the present invention, the driving device only performs the large step transferring.

According to this image scanning apparatus, the main-scanning is performed only in the large step transferring, and hence it is advantageous for roughly scanning the image. For example, it is useful that a film scanner scans thumbnails and the like.

According to still another mode of the present invention, the image scanning apparatus further comprises an image data combining device for digital-processing discrete image data of at least two lines or more outputted from the imaging device, and for combining the data into data for one image.

According to this image scanning apparatus, the image data combining device digital-processes the discrete image data of at least two lines or more and combines these into the data for one image.

According to yet another mode of the image scanning apparatus of the present invention, the illuminating device includes a device for performing color separation illumination to separate the original document into two colors or more, and in which the line sensors are monochrome CCD line sensors.

In the image scanning apparatus, the illuminating device performs the color separation illumination to separate the original document into the two colors or more so that the monochrome CCD line sensor can be used as a line sensor.

According to still another mode of the present invention, a storage medium for storing a controlling procedure of an image scanning apparatus comprises an illuminating device for illuminating an original document, an original document transferring device for transferring the original document to an image scanning position, and an imaging device having at least two or more line sensors which receive light from the original document in a plurality of pixels and which are provided with predetermined line intervals, for outputting a plurality of image data representing the received light intensity by the plurality of pixels, from each of the line sensors. The controlling procedure includes: assuming in the original document a plurality of areas where the transfer is to be performed at a long pitch, and a plurality of areas where the transfer is to be performed at a short pitch, included in each of the areas where the transfer is to be performed at a long pitch: sub-scanning the document at a short pitch at least once in the area where the transfer is to be performed at a long pitch and then sub-scanning the document by performing the large step transferring; and repeating sub-scanning by alternately performing the large step transferring and the small step transferring.

Thus, a storage medium which stores the controlling procedure for the above image scanning apparatus of the first basic mode can be provided.

According to yet another mode of the present invention, a control program for an image scanning apparatus comprising an illuminating device for illuminating an original document, an original document transferring device for transferring the original document to an image scanning position, and an imaging device having at least two or more line sensors which receive light from the original document in a plurality of pixels and which are provided with predetermined line intervals, for outputting a plurality of image data representing the received light intensity by the plurality of pixels from each of the line sensors. The control program comprises a scanning procedure of: assuming in the original document a plurality of areas where the transfer is to be performed at a long pitch, and a plurality of areas where the transfer is to be performed at a short pitch, included in each of the areas where the transfer is to be performed at a long pitch; sub-scanning the document at least once by performing one small step transferring in the area where the transfer is performed at a long pitch and then sub-scanning the document by performing a large step transferring; and repeating the sub-scanning by performing the large step transferring and the small step transferring by turns.

Thus, a control program for the image scanning apparatus of the first basic mode can be provided.

The image scanning apparatus according to a second basic mode of the present invention comprises: an illuminating device for illuminating an original document; a sub-scan stage for mounting an original document and transferring in a sub-scan direction; an imaging device having two or more line sensors on its surface, for outputting a plurality of analog image data by the line sensor, the line sensors receiving light from the original document in a plurality of pixels, the analog image data being in a main-scan direction and representing received light intensity by each of the plurality of pixels; a driving device for driving the sub-scan stage in a sub-scan direction; and a maximum image data detecting device for obtaining image data by converting analog image data of two or more lines which is output in sequence from the two or more line sensors provided on the image device, and for obtaining a maximum output of the image data of the lines.

In the image scanning apparatus, a plurality of analog image data output from two or more line sensors can be converted into a plurality of image data by a single scanning in a main-scan direction, which allows obtaining of a maximum value from the converted image data. The image scanning apparatus is preferable for obtaining accurate shading correction coefficient.

According to another mode of the present invention, the image scanning apparatus is constructed so as to divide outputs of each of two or more line sensors to be output from a plurality of taps which are provided in each of the line sensors.

In the image scanning apparatus, analog image data can be read from the plurality of taps, which heightens the speed of data processing.

According to yet another mode of the present invention, the image scanning apparatus further comprises a white balance detecting device. The illuminating device sequentially emits light in one or more color(s) during an initial exposure time which is determined in advance and the imaging device receives reflective light from a reference white plate or light passing through a transparent window and outputs image data representing received light intensity by each pixel of the two or more line sensors. The reference white plate and the transparent window are provided on the sub-scan stage. The white balance detecting device determines white balance according to maximum values for each color in the image data.

This image scanning apparatus enables determining of white balance by a single scanning in a main-scan direction in an image scanning apparatus using a plurality of CCD line sensors, with all of the image data (all pixels) output from the plurality of CCD line sensors taken into consideration. Accordingly, the image scanning apparatus is preferable for obtaining accurate shading correction coefficient.

According to another mode of the image scanning apparatus in the present invention, the white balance detecting device determines an exposure time necessary for obtaining white balance by dividing a maximum output of the A/D converter by the maximum value of the image data and multiplying the resultant by the initial exposure time.

In the image scanning apparatus it is possible to determine an exposure time necessary for obtaining optimal white balance.

According to another mode of the image scanning apparatus in the present invention, the white balance detecting device calculates shading correction coefficients Snm (n: line sensor number, m: pixel number, both n and m being positive integers) for each color by dividing each of the A/D converted image data by the maximum value of the image data and obtaining shading correction coefficients Snm by each pixel of two or more line sensors.

In the image scanning apparatus, shading correction coefficients Snm by each pixel can be accurately obtained in two or more line sensors.

According to a storage medium for storing a controlling procedure of an image scanning apparatus of a second basic mode in the present invention, the image scanning apparatus comprises: an illuminating device for illuminating an original document; a sub-scan stage for mounting an original document and transferring in a sub-scan direction; an imaging device having two or more line sensors on its surface, for outputting a plurality of analog image data by the line sensor, the line sensors receiving light from the original document in a plurality of pixels, the analog image data being in a main-scan direction and representing received light intensity by each of the plurality of pixels; a driving device for driving the sub-scan stage in a sub-scan direction; a maximum image data detecting device for obtaining image data by converting analog image data of two or more lines with an A/D converter and obtaining a maximum value of the obtained image data of the two or more lines, the analog image data being output in sequence from the two or more line sensors on the image device; and a white balance detecting device for determining white balance. The storage medium stores a controlling procedure of: sequentially emitting light in one or more color(s) during an initial exposure time which is determined in advance; receiving reflective light from a reference white plate or light passing through a transparent window and outputting image data representing received light intensity by each pixel of the two or more line sensors, the reference white plate and the transparent window being provided on the sub-scan stage; and determining white balance according to maximum outputs for each color in the image data.

As described above, the storage medium for storing a controlling procedure of the image scanning apparatus of the second basic mode can be provided. Specifically, the image scanning apparatus is suitable for obtaining accurate shading correction coefficients.

According to another mode of present invention, the storage medium stores a procedure of determining an exposure time necessary for obtaining white balance by dividing a maximum output of the A/D converter by a maximum value of the image data and multiplying the resultant by the initial exposure time.

The storage medium is suitable for obtaining accurate shading correction coefficients in the image scanning apparatus.

According to another mode of present invention, the storage medium stores a procedure of obtaining shading correction coefficients Snm (n: line sensor number, m: pixel number, both n and m being positive integers) by each pixel of two or more line sensors by dividing the maximum output of the A/D converter by the exposure time necessary for obtaining white balance.

The storage medium is suitable for obtaining an exposure time required for accurately obtaining shading correction coefficients in the image scanning apparatus.

According to another mode of the present invention, the storage medium stores a procedure of calculating shading correction coefficients Snm (n: line sensor number, m: pixel number, both n and m being positive integers) for each color by dividing shading correction coefficients Snm by each pixel of two or more line sensors by the maximum value of the image data.

The storage medium is suitable for accurately obtaining shading correction coefficients Snm by each pixel of two or more line sensors in the image scanning apparatus.

In a control program for the image scanning apparatus of the second basic mode in the present invention, the image scanning apparatus comprises: an illuminating device for illuminating an original document; a sub-scan stage for mounting an original document and transferring in a sub-scan direction; an imaging device having two or more line sensors on its surface, for outputting a plurality of analog image data by the line sensor, the line sensors receiving light from the original document in a plurality of pixels, the analog image data being in a main-scan direction and representing received light intensity by each of the plurality of pixels; a driving device for driving the sub-scan stage in a sub-scan direction; a maximum image data detecting device for obtaining image data by converting analog image data of two or more lines with an A/D converter and obtaining a maximum output of the obtained image data, the analog image data being output in sequence from the two or more line sensors provided on said image device; and a white balance detecting device for determining white balance. The control program includes procedures of: sequentially emitting light in one or more color(s) during an initial exposure time which is determined in advance; receiving reflective light from a reference white plate or light passing through a transparent window, and outputting image data representing received light intensity by each pixel of said two or more line sensors, the reference white plate and the transparent window being provided on said sub-scan stage; and determining white balance according to maximum outputs for each color in the image data.

Thus, a control program for the image scanning apparatus of the second basic mode can be provided. Specifically, the image scanning apparatus is useful for obtaining accurate shading correction coefficients.

According to another mode of the present invention, the control program includes a procedure of determining an exposure time necessary for obtaining white balance by dividing the maximum output of the A/D converter by the maximum value of the image data and multiplying the resultant by the initial exposure time.

The control program is suitable for obtaining accurate shading correction coefficients Snm in the image scanning apparatus.

According to another mode of the present invention, the control program includes a procedure of obtaining shading correction coefficients Snm (n: line sensor number, m: pixel number, both n and m being positive integers) by each pixel of two or more line sensors by dividing the maximum output of the A/D converter by an exposure time for necessary for obtaining white balance.

The control program is suitable for obtaining an exposure time necessary for obtaining accurate shading correction coefficients Snm in the image scanning apparatus.

According to another mode of the present invention, the control program includes a procedure of calculating shading correction coefficients Snm (n: line sensor number, m: pixel number, both n and m being positive integers) for each color by dividing shading correction coefficients Snm by each pixel of two or more line sensors by a maximum value of the image data.

The control program is suitable for obtaining accurate shading correction coefficients Snm by each pixel of two or more line sensors in the image scanning apparatus.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 13 shows an example of shading correction coefficient obtained at each pixel of 3-line CCD red data; and FIG. 14 shows an example where waveform shaping is performed by employing the shading correction coefficient shown in FIG. 13.

DESCRIPTION OF THE PREFERRED EMBODIMENTS

Hereinafter, preferred embodiments of the present invention will be explained.

Figure 1:
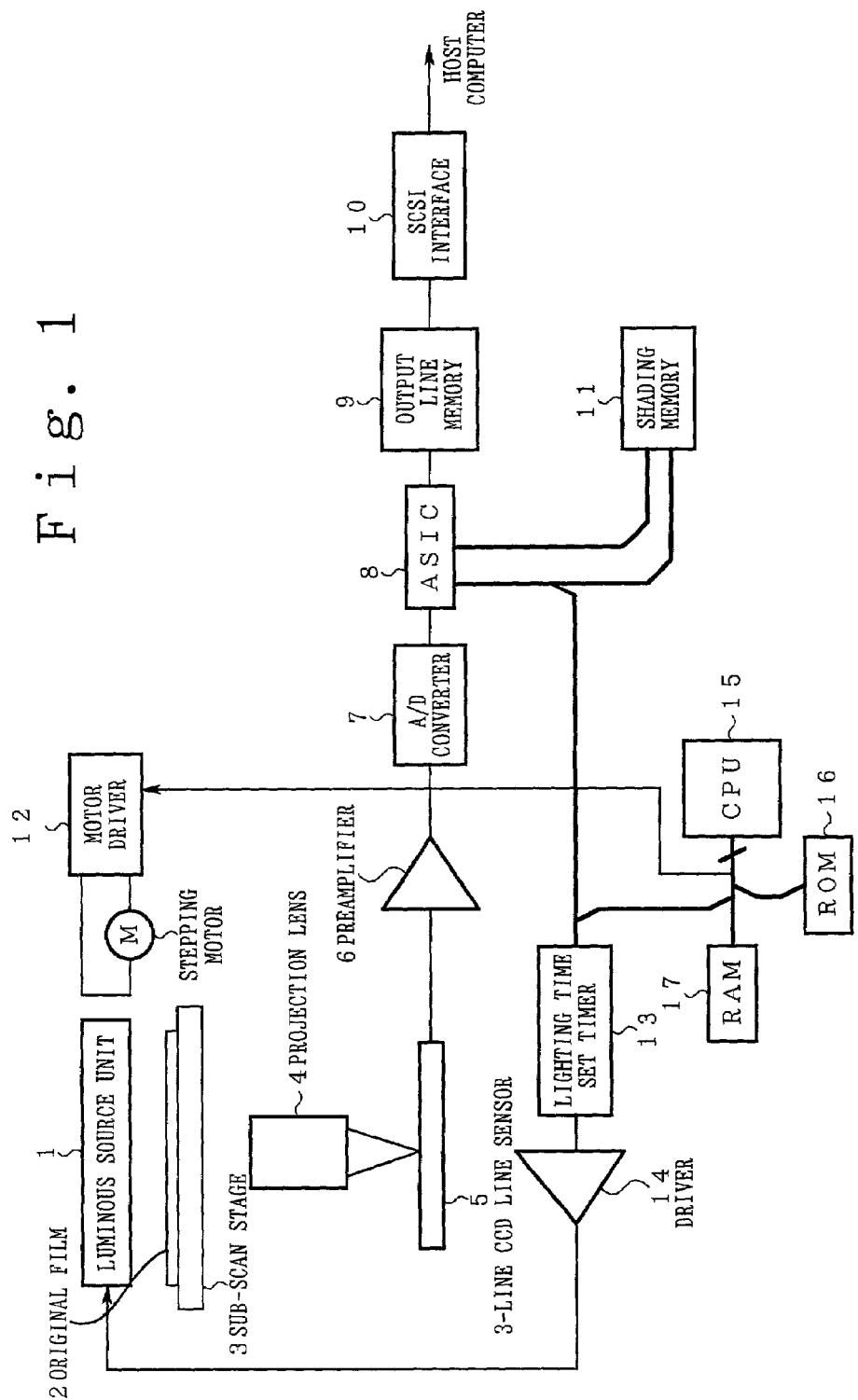
FIG. 1 shows an example of an image scanning apparatus (film scanner) to which the present invention is applied.

FIG. 1 is a view showing an example of an image scanning apparatus to which the present invention is applied. FIG. 1 shows a film scanner as an example of the image scanning apparatus.

The film scanner shown in FIG. 1 is structured by having: a luminous source unit 1 (LED luminous source); an original film (negative or positive (reversal) film) 2 which is illuminated by the luminous source unit 1; a sub-scan stage 3 on which the original film 2 is mounted; a projection lens 4 which forms an image of the original film 2 illuminated by the luminous source unit 1; monochrome 3-line CCD line sensors 5 provided on the surface of a chip (imaging device) for converting the image formed by the projection lens 4 into an analog image data; a preamplifier 6 which amplifies the analog image data; an A/D converter 7 which converts the analog image data outputted from the preamplifier 6 into a digital image data; an ASIC (Application Specific IC) 8 which operates a shading correction and the like to the digital image data outputted from the A/D converter 7; output line memory 9 which temporarily stores the digital image data outputted from the ASIC 8; a SCSI interface 10 for outputting the digital image data which is read out from the output line memory 9 to a not-shown host computer; shading memory 11 which stores data for the shading correction; a motor driver 12 and a stepping motor M for moving the sub-scan stage 3 by a predetermined distance; a lighting time set timer 13 for setting lighting time of the luminous source unit 1; a driver 14 for outputting the lighting time which is set by the lighting time set timer 13 to the luminous source unit 1; a CPU 15 which controls the overall operation of the film scanner shown in FIG. 1; a ROM 16 which stores a control program for operating the CPU 15; and a RAM 17 which temporarily stores various operational data.

Next, the operation of the film scanner shown in FIG. 1 will be briefly explained.

As described above, the original film 2 is illuminated by the luminous source unit 1, and its image is formed on the monochrome 3-line CCD line sensors 5.

In order to scan a color image, the luminous source unit 1 emits in sequence three illumination lights having the colors of R-color, G-color and B-color, with different peak wavelengths from each other. Thereby, the luminous source unit 1 allows color separation of the original film 2.

The 3-line CCD line sensors 5 scan a plurality of tetragonal pixels. Supposing that the length of one side of the tetragonal pixel is P, the 3-line CCD line sensors 5 are structured to have intervals of the respective three lines, 8P. In other words, the 3-line CCD line sensors 5 scan every eight lines, not adjacent lines.

Next, the sub-scan stage 3 is transferred by, for example, one line to a direction orthogonal to a direction (main-scan direction) of a one-dimensional image which is formed on the 3-line CCD line sensors 5, thereby scanning a two-dimensional image. Hereinafter, this will be referred to as a small step transferring.

As described above, the 3-line CCD line sensors 5 scan the image with intervals of eight lines, not the adjacent lines. Therefore, when the small step transferring is made line by line, they reach the line which is already scanned in the eighth small step transferring.

For this reason, instead of the eighth small step transferring, a large step transferring which is a transfer performed by 24 lines (8 lines×3) at a time, is made.

After the large step transferring, the small step transferring is repeated again.

Thus, the small step transferring and the large step transferring are repeated so that the respective analog image data of the R-color, G-color and B-color all over the image can be obtained. Specifically, in scanning the image, the illumination lights having the three colors (R-color, G-color, B-color) are flashed in sequence and sub-scanning of the small step transferring and the large step transferring are repeated to obtain the analog image data of the R-color, G-color and B-color for the respective lines.

The scanned analog image data are quantized in the A/D converter 7. The digital image data outputted from the A/D converter 7 are transmitted in sequence to the ASIC 8 line-by-line to be subjected to the shading correction by each pixel. It should be mentioned that shading information is computed in advance from transmitted light in a transparent area on the sub-scan stage 3 where the original film 2 does not exist, which is written in the shading memory 11 being direct-coupled to the ASIC 8. In using the 3-line CCD line sensors, all the pixels in the three lines need to be subjected to the shading correction; otherwise noise streaks and the like may occur in a reproduced image due to level fluctuations in each of the lines.

Incidentally, bold lines in FIG. 1 are busses. As a line connecting the CPU 15 and the motor driver 12, either a normal line or a bus may be used.

Figure 2:
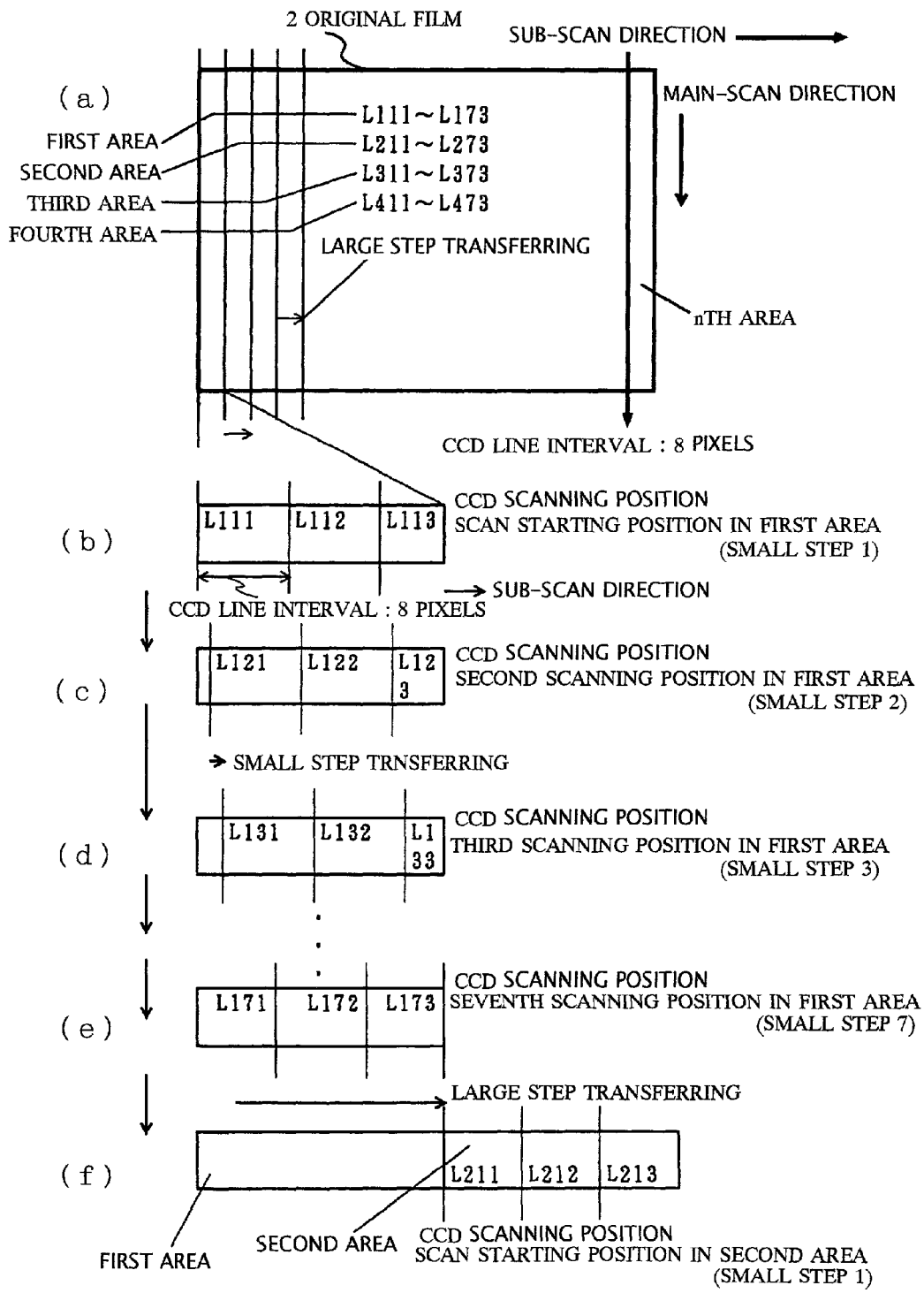
FIG. 2 are explanatory views showing an example of the image scanning operations of the image scanning apparatus (film scanner) shown in FIG. 1.
Figure 3:
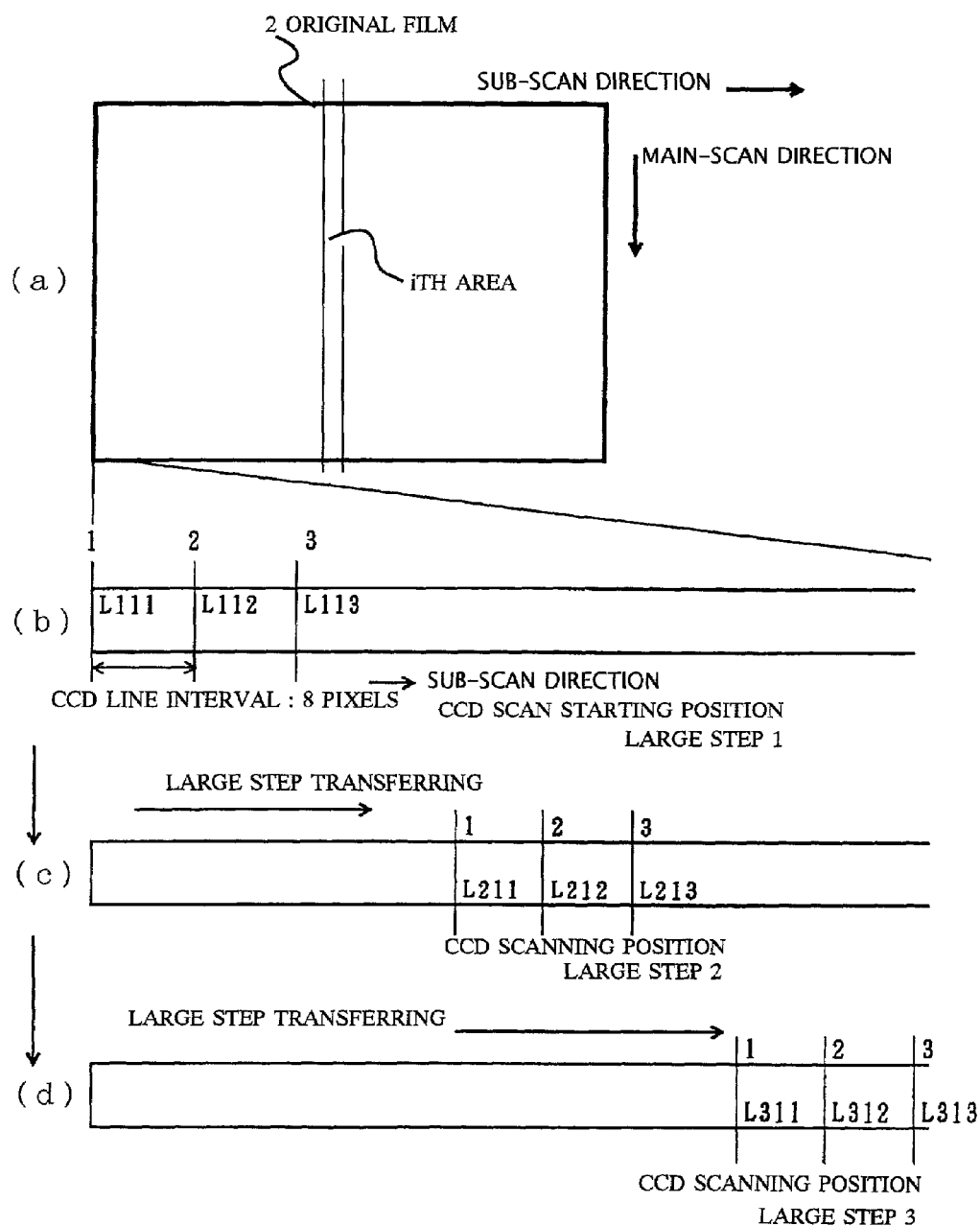
FIG. 3 are explanatory views showing another example of the image scanning operations of the image scanning apparatus (film scanner) shown in FIG. 1.

FIG. 2 and FIG. 3 are explanatory views showing examples of the image scanning operations of the film scanner shown in FIG. 1.

As shown in FIG. 2(a), the original film 2 is divided into a first area to an nth area by large step pitches, and as shown in FIG. 2(b) to FIG. 2(e), the respective areas are divided into a small step 1 to a small step 7 by small step pitches. Here, the large step pitch is a distance over which the original film 2 is transferred by performing one large step transferring. Further, the small step pitch is a distance over which the original film 2 is transferred by performing one small step transferring.

The meanings of L111 to L173 and so on in the original film 2 are as follows. Take L173 as an example, the first "1" means the first area (large step). "7" in the middle of L173 means the small step. The last "3" in L173 means the third line sensor (number of the sensor) out of the 3-line CCD line sensors.

As shown in FIG. 2(*b*), the film scanner shown in FIG. 1 scans L111 to L173 in the small step 1.

Next, as shown in FIG. 2(*c*), the film scanner scans L121 to L123 in the small step 2. Thereafter, the scanning continues similarly by the small steps, and L171 to L173 are scanned in the small step 7 as shown in FIG. 2(*e*).

The entire image in the first area is scanned by the above-mentioned small steps 1 to 7.

Next, the large step transferring (8×3=24 small step transferrings) is made by the film scanner shown in FIG. 1 in order to scan the second area, as shown in FIG. 2(*f*).

Thus, the film scanner shown in FIG. 1 repeats the large step transferring and the small step transferring, thereby taking in the entire image.

FIG. 3 are explanatory views showing another example of the image scanning operations of the film scanner shown in FIG. 1.

In FIG. 3, only the large step transferring is made, and the small step transferring as shown in FIG. 2(*b*), FIG. 2(*c*), FIG. 2(*d*) are not made in the ith area (i=1 to n). A scanning method as shown in FIG. 3 is useful in scanning thumbnails.

FIG. 4 to FIG. 9 are flow charts showing the operations of the film scanner shown in FIG. 1, including the operations with the host computer. Steps until the color image is actually taken into the host computer are included in these flow charts.

Figure 4:
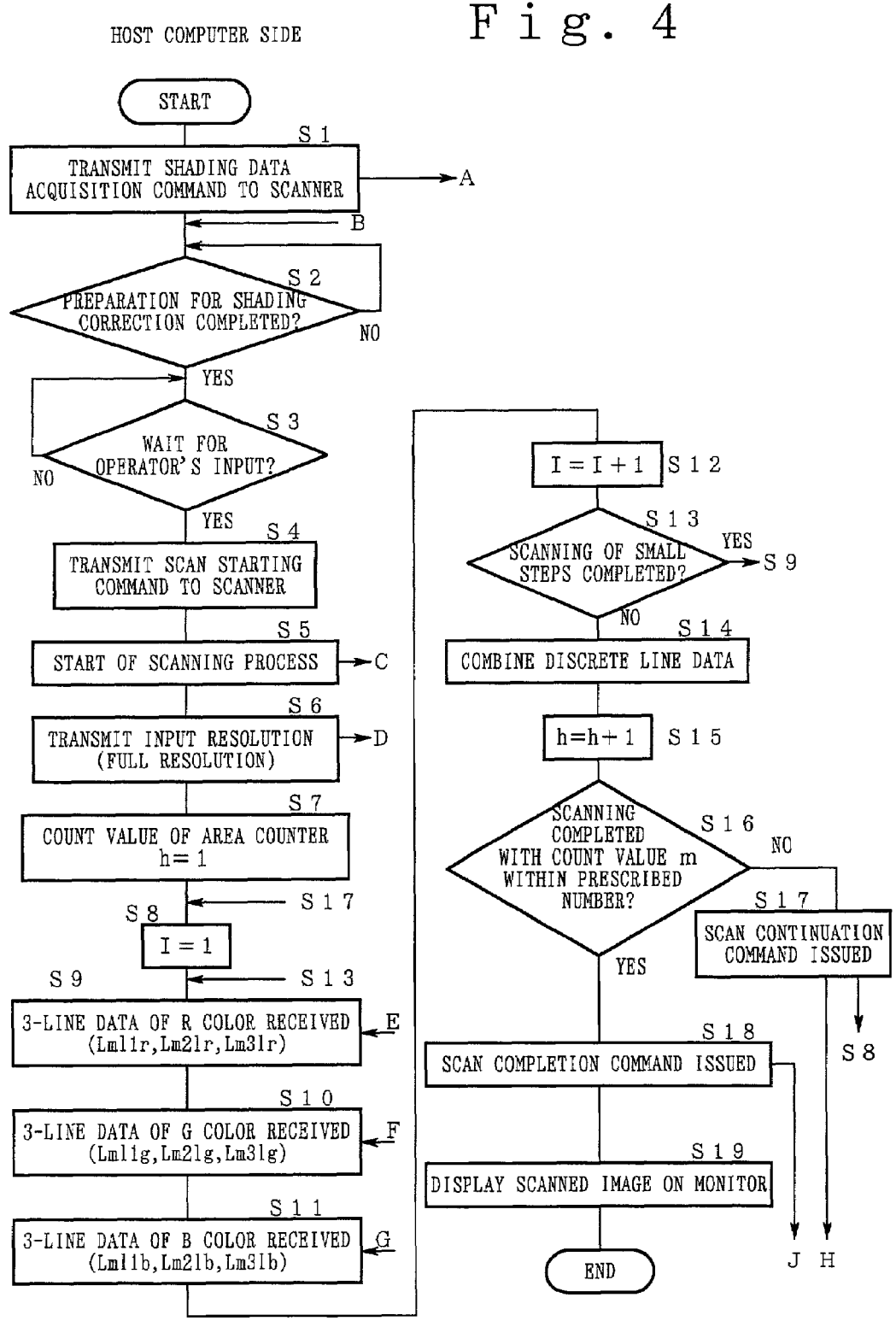
FIG. 4 is a flow chart showing the operation of a host computer shown in FIG. 1.

As shown in FIG. 4, a CPU of the host computer transmits a shading data acquisition command to the film scanner in a step S1 (refer to A in FIG. 4).

Figure 5:
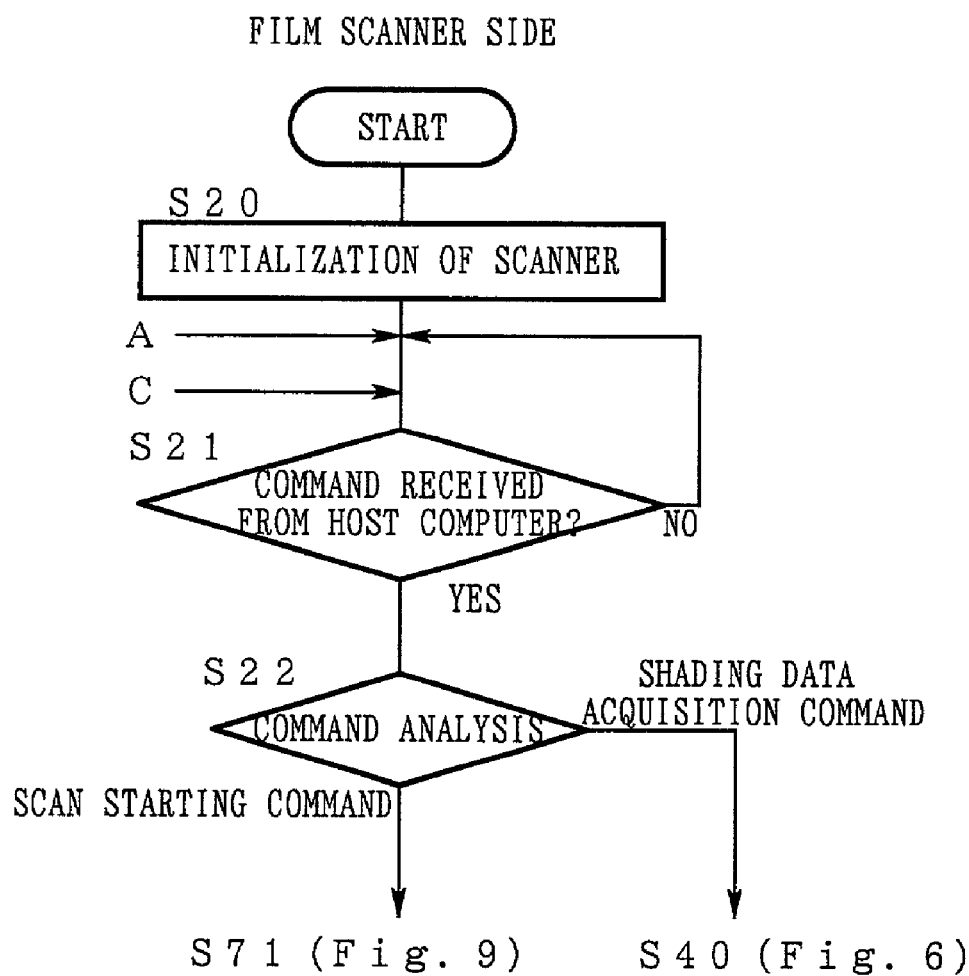
FIG. 5 is a flow chart showing the operation of the film scanner shown in FIG. 1 in association with the operation of the host computer.

As shown in FIG. 5, the CPU 15 of the film scanner completes initialization of the scanner itself in a step S20 and is on standby under this condition. The initialization is carried out by turning on the power of the film scanner or the like.

Receiving the shading data acquisition command (refer to A), the CPU 15 moves to a step S21 to determine that it received a command from the host computer.

Figure 6:
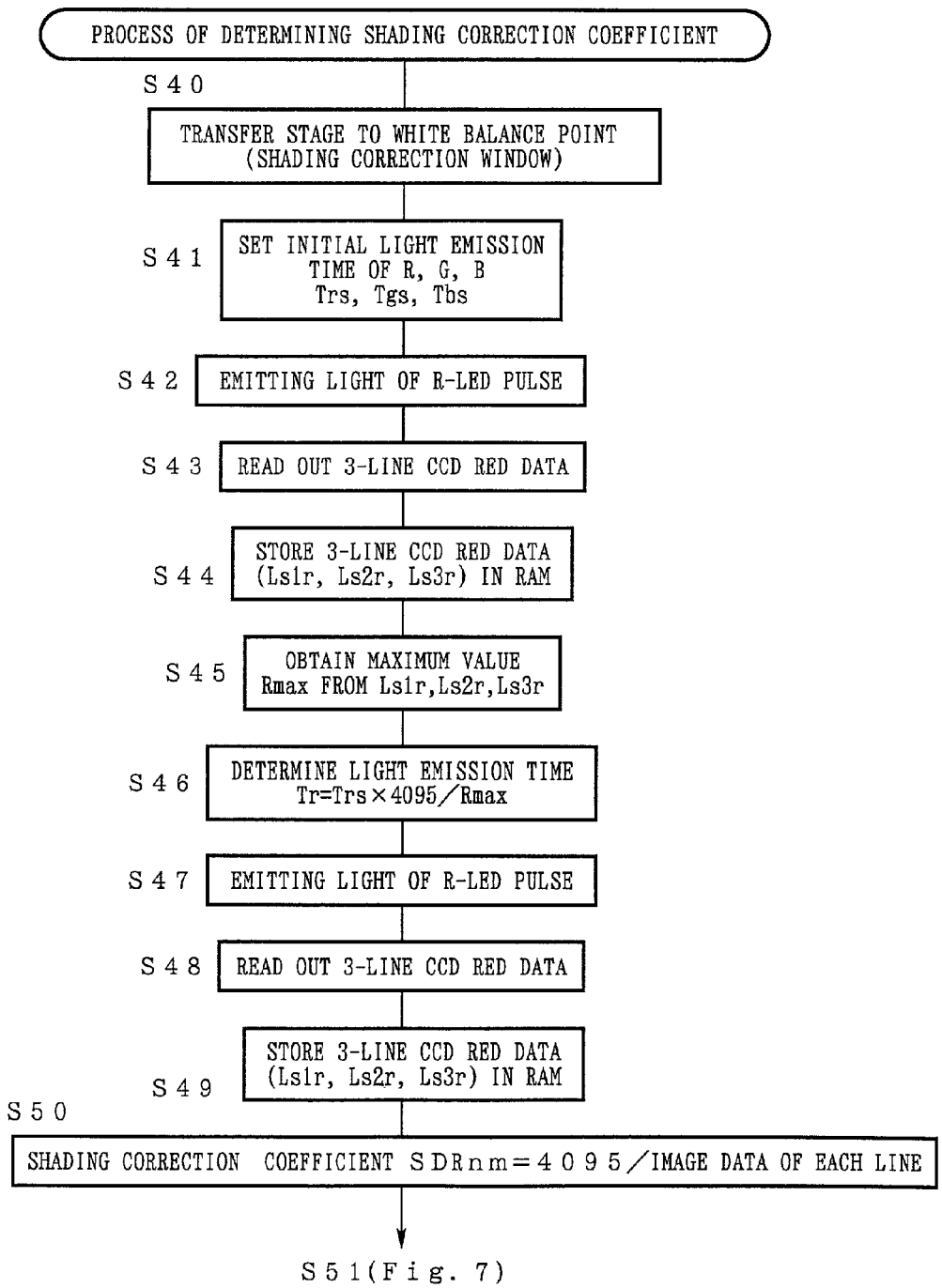
FIG. 6 is a flow chart showing the operation of the film scanner shown in FIG. 1 in association with the operation of the host computer.

In a step S22, the CPU 15 of the film scanner determines that the above command is the shading data acquisition command, and moves to a step S40 shown in FIG. 6.

In the step S40 shown in FIG. 6, the CPU 15 of the film scanner transfers the sub-scan stage 3 to a white balance point. It should be mentioned that the white balance point is the transparent area (a shading correction window) without the original film 2. The 3-line CCD line sensors 5 output the analog image data which is decided according to total spectral sensitivity by the luminous source unit 1, the projection lens 4 and the 3-line CCD line sensors 5. As well-known, there are film scanners where reflective light from reference white plates are employed as white balance points.

The aforesaid transfer of the sub-scan stage 3 to the white balance point is carried out by the CPU 15 commanding the motor driver 12 to drive the stepping motor M.

In a step S41, the CPU 15 set initial light emission times Trs, Tgs, and Tbs of the R-color, G-color and B-color, respectively, to the lighting time set timer 13 shown in FIG. 1, and sends these out to the luminous source unit 1 through the driver 14. It should be noted that in the initial light emission times Trs, Tgs, and Tbs the amount of emission light is an amount which allows the monochrome 3-line CCD line sensors 5 not to be saturated (for example, an amount about 70 percent of saturation emission light amount).

In a step S42, the CPU 15 allows R-LED of the luminous source unit 1 to emit light for the initial light emission time Trs.

In a step S43, the CPU 15 reads each analog image data (on a pixel basis), from the 3-line CCD line sensors 5 shown in FIG. 1 and converts them to image data (on a pixel basis) to output the data as 3-line CCD red data Ls1r, Ls2r, and Ls3r.

Figure 11:
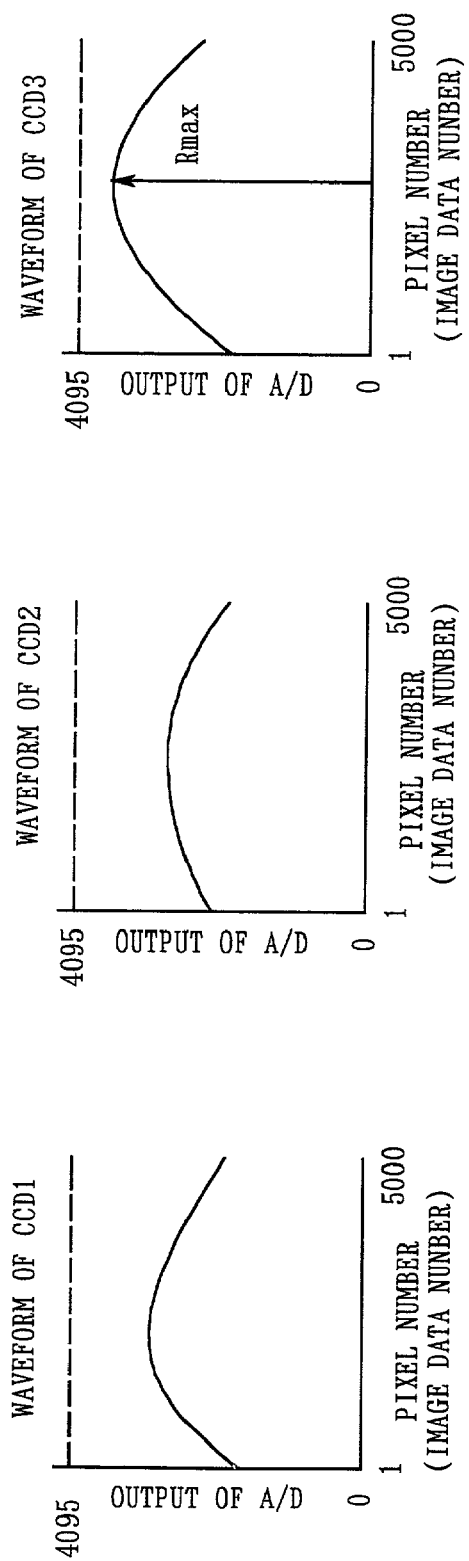
FIG. 11 shows a n example of 3-line CCD red data.

FIG. 11 shows one example of the 3-line CCD red data Ls1r, Ls2r, and Ls3r. In this case, a number of pixels in one line is set at 5000 and the maximum output of the AD converter 7 is set at 4095 (12 bits). Each pixel data is not saturated.

In a step S44 of FIG. 6, the CPU 15 stores, in the RAM 17, all of the 3-line CCD red data Ls1r, Ls2r, and Ls3r which were read out in the step S43.

In a step S45, the CPU 15 determines a maximum value Rmax in the unit of pixels, from Ls1r, Ls2r, and Ls3r which are stored in the RAM 17.

In a step S46, the CPU 15 determines lighting time Tr of the R-LED of the luminous source unit 1, based on the following equation.

$$Tr = Trs \times 4095 / Rmax$$

In the lighting time, sufficient exposure amount is given in order to have the maximum image data output be consistent with the maximum output of the AD converter 7. In the above equation, "4095" signifies the maximum output of the AD converter 7 (12 bits).

In a step S47, the CPU 15 allows R-LED of the luminous source unit 1 to emit light for the initial lighting time Tr.

In a step S48, the CPU 15 reads each analog image data from the 3-line CCD line sensors 5 shown in FIG. 1 and converts them to image data to output the data as 3-line CCD red data Ls1r, Ls2r, and Ls3r.

Figure 12:
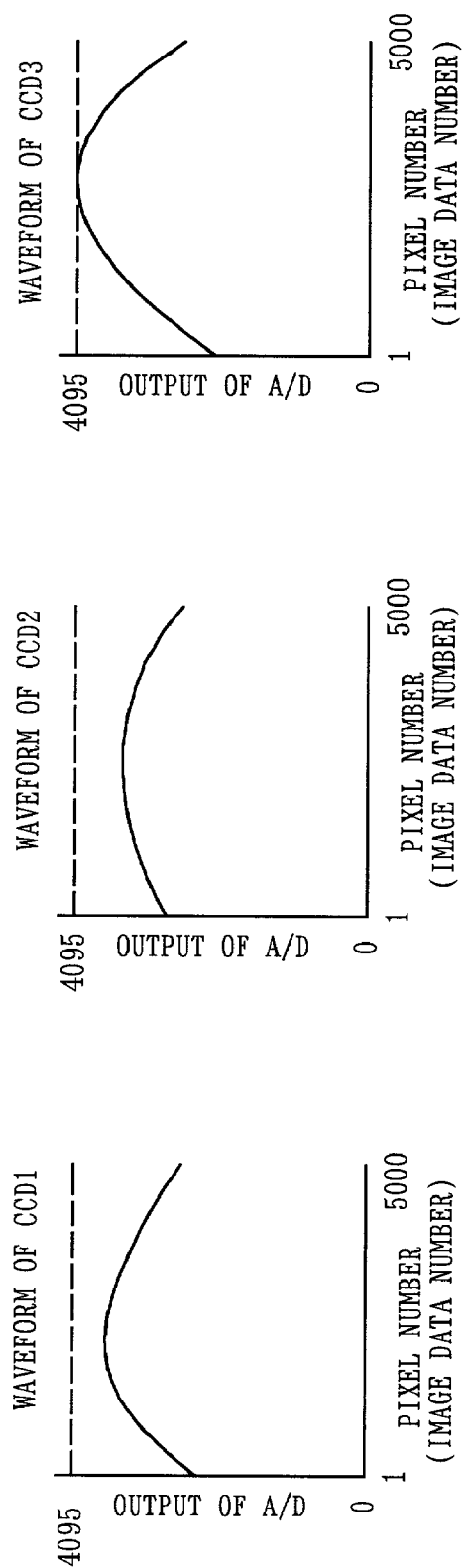
FIG. 12 show an example of white balance in 3-line CCD red data.

FIG. 12 shows one example of the 3-line CCD red data Ls1r, Ls2r, and Ls3r and shows a white balance. It is clear from FIG. 12 that the maximum value (see CCD 3) of pixel data is "4095" which is equivalent to the maximum output of the AD converter.

In a step S49, the CPU 15 stores all of the 3-line CCD red data Ls1r, Ls2r, and Ls3r, which is read in the step S48, in the RAM 17. The RAM 17 stores image data of all of pixels read by the monochrome 3-line CCD line sensors.

In a step S50, the CPU 15 reads each pixel data of the 3-line CCD red data Ls1r, Ls2r, and Ls3r and divides "4095", which is the maximum output of the AD converter 7, by each pixel data to obtain a shading correction coefficient SDRnm for each pixel.

FIG. 13 shows one example of the shading correction coefficient obtained on a pixel basis for each CCD in the above manner. As shown in FIG. 12, the maximum output of the AD converter 7 corresponds to a shading correction coefficient "1". This signifies that the pixel does not need to be corrected.

In FIG. 14, waveform shaping is performed by using the shading correction coefficient of FIG. 13, therefore, the output waveforms are flat.

Figure 7:
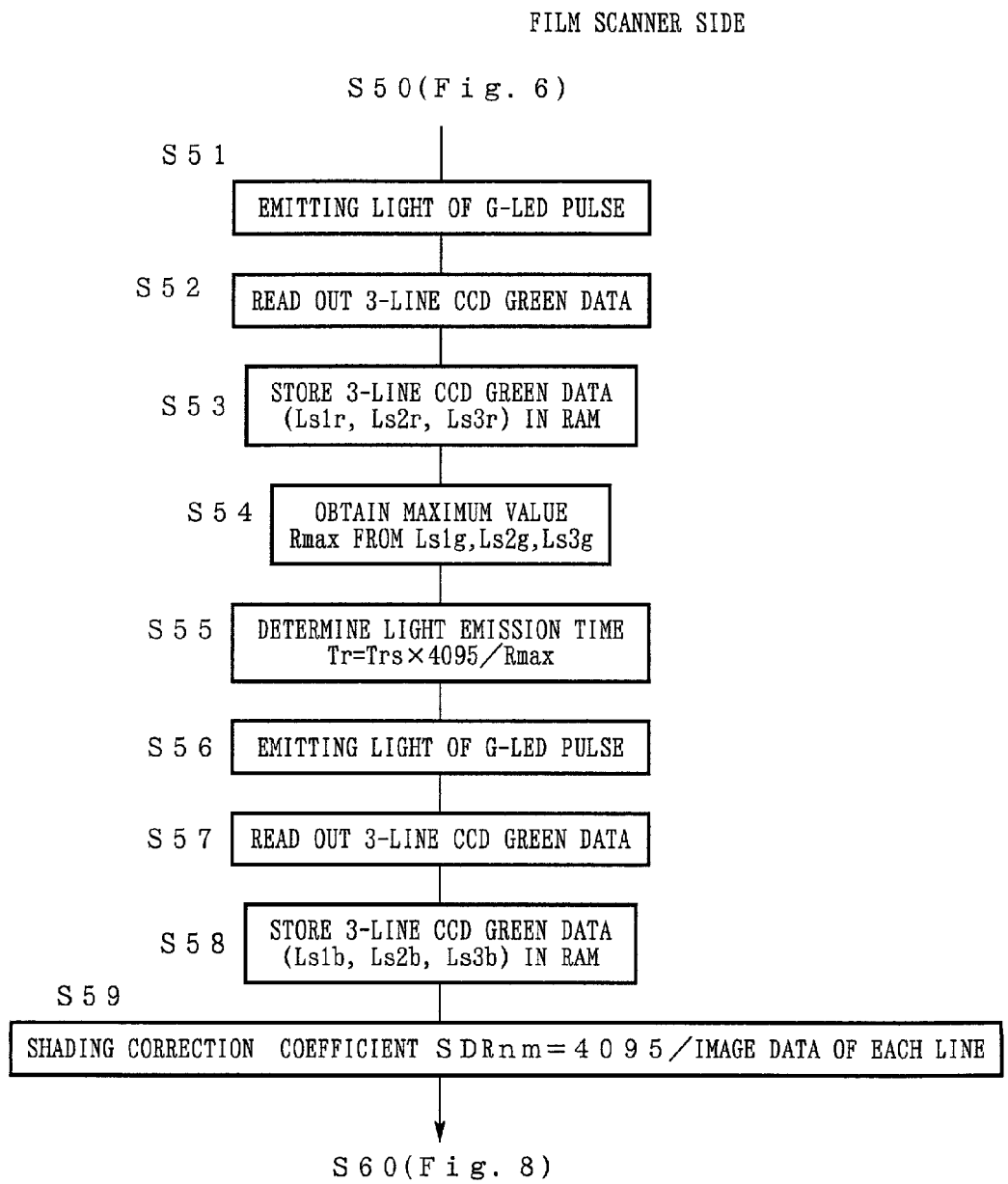
FIG. 7 is a flow chart showing the operation of the film scanner shown in FIG. 1 in association with the operation of the host computer.

Moreover, S51 to S59 shown in FIG. 7 are the steps for determining lighting time Tg of G-LED (step S52) and shading correction coefficient SDGnm concerning green data (step S53), which are the same with the processing for the red data as shown in the steps S42 to S50, and hence explanations thereof are omitted.

Figure 8:
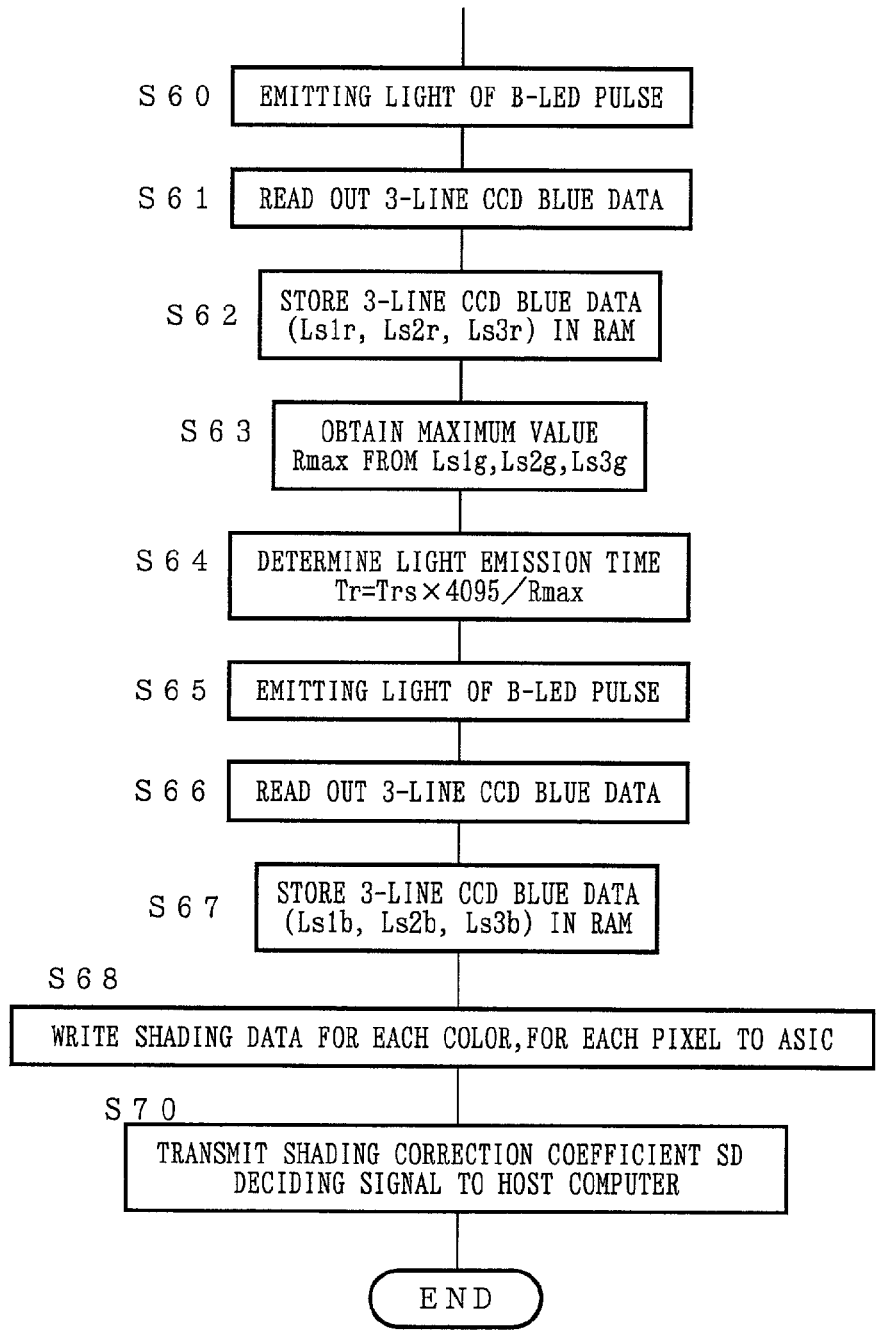
FIG. 8 is a flow chart showing the operation of the film scanner shown in FIG. 1 in association with the operation of the host computer.

Furthermore, S60 to S68 shown in FIG. 8 are the steps for determining lighting time Tg of B-LED (step S58) and shading correction coefficient SDBnm concerning green data (step S59), which are the same with the processing for the red data as shown in the steps S42 to S50, and hence explanations thereof are omitted.

In a step S69 shown in FIG. 8, the CPU 15 stores the shading correction coefficient for each color and for each pixel, from the shading memory 11 into the ASIC 8.

In a step S70, the CPU 15 sends, to the host computer, a shading correction coefficient SD (SDRnm, SDGnm, and SDBnm) deciding signal (refer to B in FIG. 8) and completes the shading correction coefficient deciding process.

As shown in FIG. 4, the CPU of the host computer receives from the film scanner a decision end signal of the shading correction data SD (refer to B in FIG. 4).

In a step S2 in FIG. 4, the host computer determines whether the preparation for the shading correction is completed or not. In this case, since the host computer has received the decision end signal of the shading correction data SD, it moves to a step.

In the step S3, the CPU of the host computer is on standby for an operator to input a scan starting instruction. When the scan starting instruction is inputted by the operator, it moves to a step S4 and transmits a scan starting command to the film scanner (refer to C in FIG. 4).

In FIG. 5, the CPU 15 of the film scanner receives the scan starting command (refer to C), continues to the step S21, and determines that it receives a command from the host computer.

In the step S22 in FIG. 5, the CPU 15 of the film scanner determines that the above command is the scan starting command, and continues to scan processing shown in FIG. 8.

The host computer outputs the scan starting command in the step S4 as shown in FIG. 4, and thereafter, starts the scan processing in a step S5.

In a step S6, the host computer transmits input resolution to the film scanner. In this case, full resolution (resolution of the original film 2 corresponding to a number of pixels of a CCD) is transmitted as scan resolution (refer to D in FIG. 4).

Figure 9:
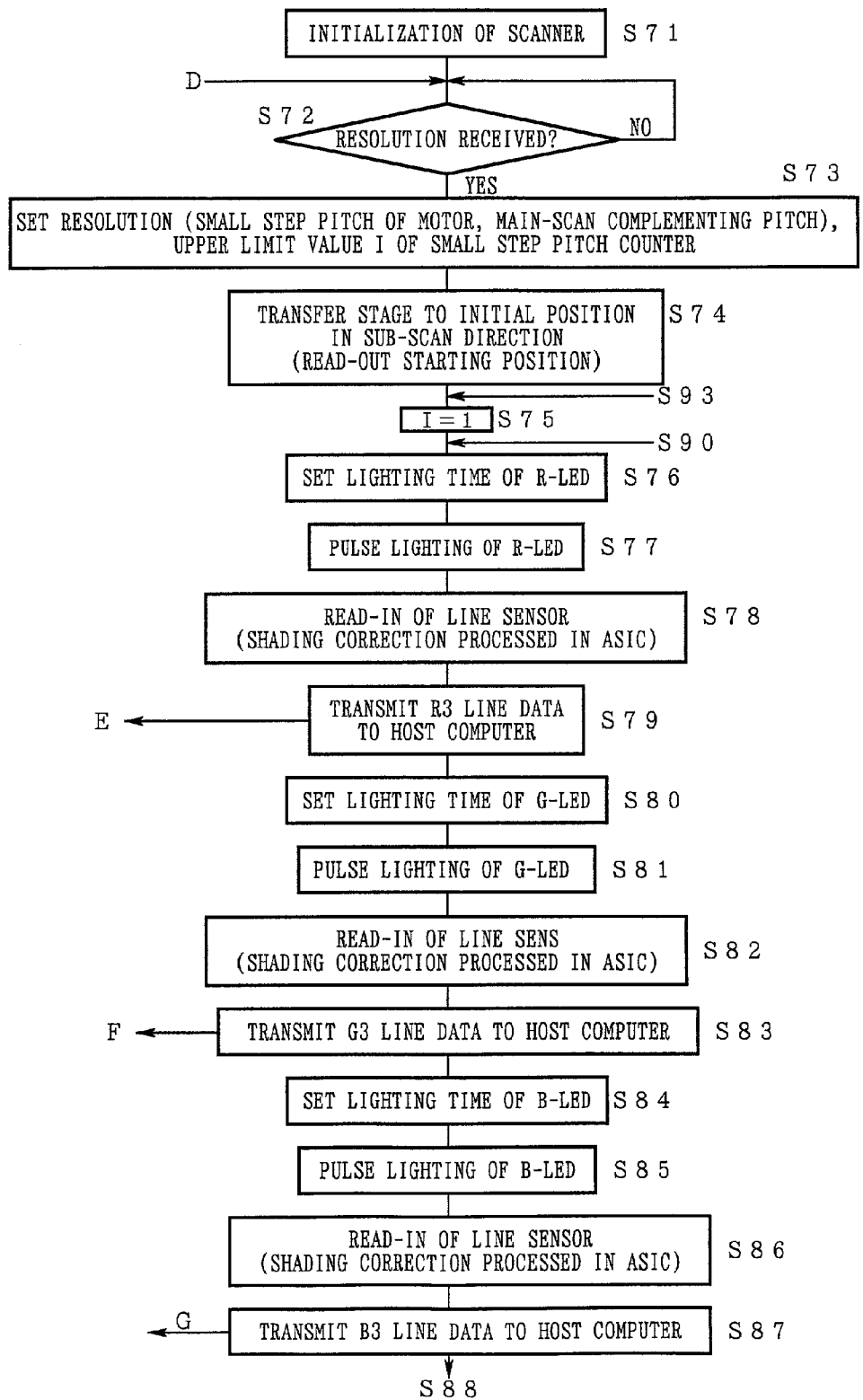
FIG. 9 is a flow chart showing the operation of the film scanner shown in FIG. 1 in association with the operation of the host computer.

Meanwhile, as in the flow chart of FIG. 9, in a step S72 the CPU 15 of the film scanner is on standby for the reception of the input resolution which is to be transmitted from the host computer after the initialization of the film scanner in a step S71 (refer to D of FIG. 9).

Upon the receipt of the input resolution from the host computer (refer to D of FIG. 9), it proceeds to a step S73 from the step S72.

In the step S73, the CPU 15 sets the resolution. Specifically, it sets the small step pitch and a main-scan complementing pitch of the stepping motor M. Moreover, it sets an upper limit value of the counting of a small step pitch counter 1. In this case, the 3-line CCD line sensors 5 scan the every eighth line, "7" is set as the upper limit value of the counting.

Next, in a step S74, the CPU 15 provides an instruction to the motor driver 12 to drive the motor M and transfer the sub-scan stage 3 to an initial position in a sub-scan direction (scan starting position).

In a step S75, a count value I of the small step pitch counter which shows the small step pitch is set at 1 (initial value).

In parallel to the above operation, count values h of a plurality of area counters which are provided on the original film 2 for counting an area number are set at 1 (initial value) by the host computer, as shown in a step S7 in FIG. 4.

Subsequently, as in a step S8 in FIG. 4, the count value I of the small step pitch counter which shows the small step number in the area is set at 1 (initial value) by the CPU of the host computer. Thereby, the CPU of the host computer becomes available for the processing of the small step 1 in the first area.

Moreover, in a step S76 in FIG. 9, the CPU 15 of the film scanner sets the lighting time Tr of the R-LED which is determined in the step S46 shown in FIG. 6 to the lighting time set timer 13 shown in FIG. 1.

Then, in a step S77, the CPU 15 allows the R-LED of the luminous source unit 1 to emit light pulses over the set time.

In a step S78, the CPU 15 outputs a scan instruction to the 3-line CCD line sensors 5. Thereby, the 3-line CCD line sensors 5 output red 3-line data (Lml1r, Lml2r, and Lml3r) to the host computer through the A/D converter 7, the ASIC 8, the output line memory 9 and the SCSI interface 10 (refer to E in step S79). Note that h is the area number of the large step transferring ("h"th area), I is a small step number, 1r is red data of the first CCD line sensor, 2r is red data of the second CCD line sensor and 3r is red data of the third CCD line sensor.

Specifically, red 3-line data (L111r, L112r, and L113r) are transmitted to the host computer in a step S79.

As shown in FIG. 4, the CPU of the host computer receives the red 3-line data (Lml1r, Lml2r, and Lml3r) from the film scanner (refer to E in FIG. 4).

In steps S80 to S83 shown in FIG. 9, green 3-line data (Lhl1g, Lhl2g, and Lhl3g) are outputted to the host computer through the A/D converter 7, the ASIC 8, the output line memory 9 and the SCSI interface 10 (refer to F). The operations are the same with those for the red color in the steps S76 to S79, and hence explanations thereof are omitted.

Similarly, in steps S84 to S87 shown in FIG. 9, blue 3-line data (Lhl1b, Lhl2b, and Lhl3b) are outputted to the host computer through the A/D converter 7, the ASIC 8, the output line memory 9 and the SCSI interface 10 (refer to G). The operations are the same with those for the red color in the steps S76 to S79, and hence explanations thereof are omitted.

The host computer shown in FIG. 4 receives the green 3-line data (Lhlg, Lhl2g, and Lhl3g) in a step S10 (refer to F).

Similarly, the host computer shown in FIG. 4 receives the blue 3-line data (Lhl1b, Lhl2b, and Lhl3b) in a step S11 (refer to G).

Figure 10:
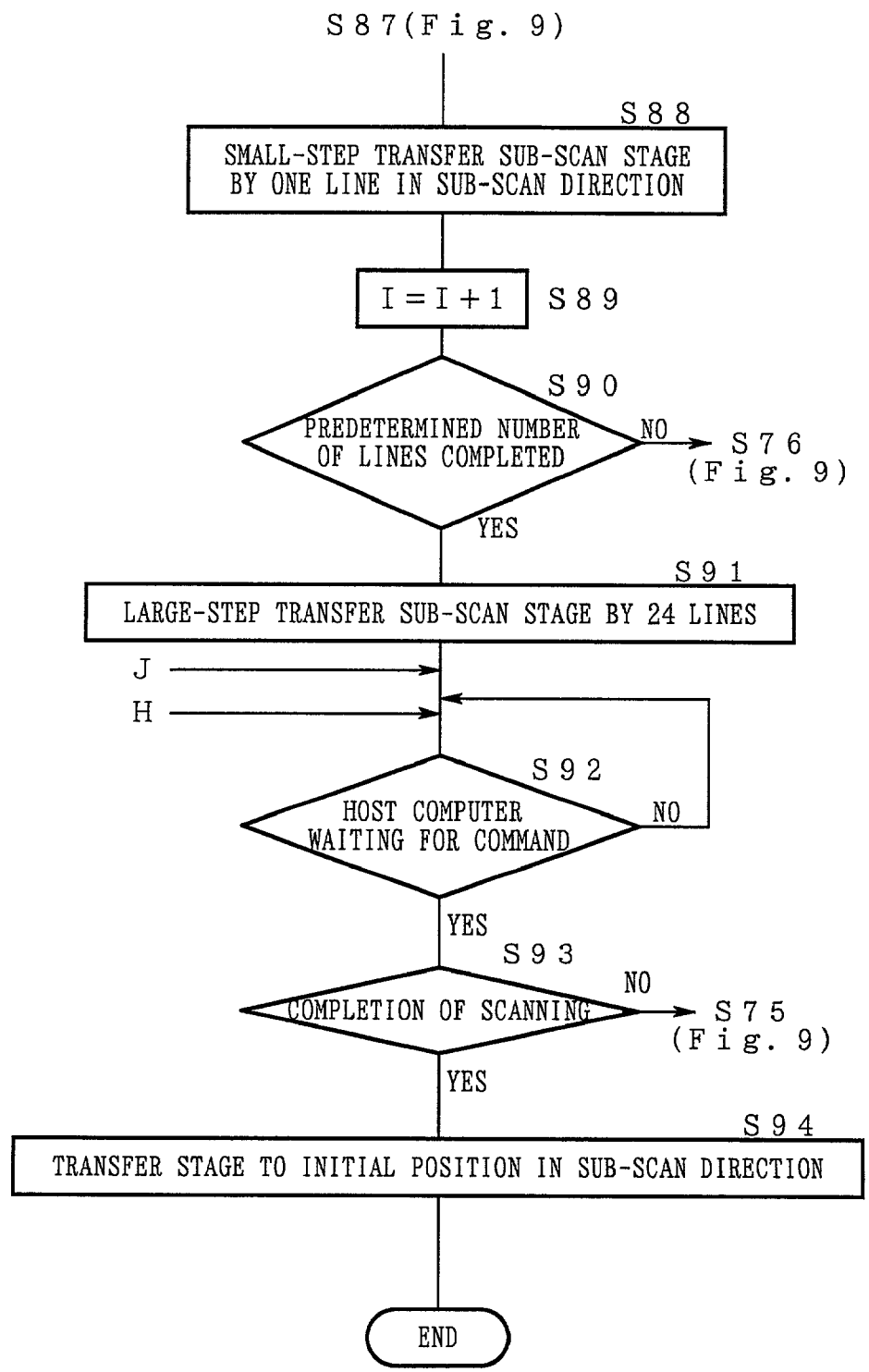
FIG. 10 is a chart showing the operation of the film scanner shown in FIG. 1 in association with the operation of the host computer.

In a step S88 shown in FIG. 10, the CPU 15 allows the sub-scan stage 3 to make the small step transferring by one line in the sub-scan direction.

Next, in a step S89, the CPU 15 adds 1 to the count value I of the small step pitch counter for an update. Thereby, the small step 2 in the first area is scanned next.

In a step S90, the CPU 15 determines whether all the small steps (seven steps) in the area are scanned or not.

When determined not being scanned, it returns to the step S76 to repeat the processing in the steps S76 to S89.

When it is determined in the step S90 that all of these are scanned, it moves to a step S91 in which the sub-scan stage 3 makes the large step transferring over the 24 lines, and moves to a step S92.

Moreover, in a step S12 shown in FIG. 4, the CPU of the host computer adds 1 to the count value I of the small step pitch counter for update. Thereby, the CPU of the host computer corresponds to the scanning of the small step 2 in the first area.

In a step S13, it is determined whether all the small steps (seven steps) in the first area are scanned or not. When it is determined that the scanning of the small steps is not completed, it returns to the step S9 to repeat the processing in the steps S9 to S13.

By repeating the processing in the steps S9 to S13, the 3-line data of the R-color, G-color and B-color are received from the film scanner (refer to E, F, G) and all the small steps in the area are scanned.

When determined that the scanning of all the small steps is completed, it moves to a step S14.

In the step S14, the CPU of the host computer combines the line data in the area where the scanning of all the small steps is completed. Incidentally, the line data may be combined in the ASIC 8 of the film scanner shown in FIG. 1 and the like, not in the host computer, and its result may be transmitted to the host computer.

In a step S15, the CPU of the host computer adds 1 to the count value h of the area counter for an update.

In a step S16, it is determined whether the count value h of the area counter reaches a specified value or not. When determined not being reached, it moves to a step S17 and the CPU of the host computer issues a scan continuation command to the film scanner (refer to H in FIGS. 4 and 10).

Moreover, when it is determined that the count value h of the area counter reaches the specified value, it moves to a step S18, in which a scan completion command is issued (refer to J in FIGS. 4 and 10). Here, the original film 2 is divided into a plurality of areas, and the width W of each area is a pixel size×line interval×3 (sub-scan direction). Therefore, an image of an original document is divided into a size of the original document×magnification of the projection lens 4/W (=upper limit value of the area counter). The host computer waits until the count value h of the area counter reaches the upper limit value, and then it transmits the scan completion command.

Next, in a step S19, the CPU of the host computer displays the scanned image on a monitor of the host computer, and completes its processing.

The scan continuation command or the scan completion command is received in the step S92 of the film scanner, as shown in FIG. 10 (refer to H, J).

When a command is received from the host computer in the step S92, it moves to a step S93.

In the step S93, the CPU 15 determines whether the received command is the scan completion command (J), which means the end of the scanning or the scan continuation command (H). When it receives the scan completion command, it moves to a step S94 and transfers the sub-scan stage 3 to its initial position. Further, when it receives the scan continuation command, it returns to the step S75 and repeats the processing from the step S75 to the step S92.

As described above, the explanation about inputting the full image is made, in which all the adjacent lines are scanned by the small step transferring from the first area to the nth area as shown in FIG. 2. The present invention is, however, not limited to the above, and for example, it is suitable to scan every second line. Further, as shown in FIG. 3, at least one line may be scanned every time the large step transferring is made.

Moreover, it is explained that the number of the CCD line sensors is three in the image scanning apparatus shown in FIG. 1, but the present invention is not limited to the above, and two or more CCD line sensors are suitable.

Further, it is explained that the CCD line sensor is the monochrome CCD line sensor in the image scanning apparatus shown in FIG. 1, but the present invention may be applied to an image scanning apparatus having two or more color CCD line sensors.

Furthermore, in the image scanning apparatus shown in FIG. 1, the seven small steps respectively are set in the first area to the nth area of the large steps, but the present invention is not limited to the above, and any number of the small steps in the area may be suitable.

Incidentally, in the above-described embodiment, the control program for the CPU 15 is stored in the ROM 16 of the image scanning apparatus, but the present invention is not limited to the above, and storage mediums such as memory, a hard disc and the like of the host computer may be used, instead of the ROM 16.

In this case, the storage medium such as the hard disc of the host computer stores a control program for carrying out the flow charts shown in FIG. 4 to FIG. 9. The CPU of the host computer reads out the program from the storage medium such as the hard disc and stores it in the memory of the host computer. Thus, the CPU of the host computer can execute the control program. Incidentally, the control program which is stored in the storage medium such as the hard disc should be stored in advance in a storage medium such as a CD-ROM to be set-up in the host computer.

Alternately, the control program for the CPU 15 may be downloaded as driver software or firmware by a terminal such as a personal computer accessing Web site via the Internet. For example, it is embodied by clicking (selecting) the film scanner as one of the image scanning apparatuses out of the products displayed on the screen, and clicking (selecting) the driver software or the firmware which matches an OS environment of the personal computer, while accessing to the Web site from the personal computer, whereby the download is executed.

Next, the connection of the terminal such as the personal computer and the Internet will be explained by taking dial-up access as an example. The terminal such as the personal computer is connected to a telephone line via a modem or a terminal adapter, and connected by the telephone line to a modem or a terminal adapter of a provider as an Internet connecting service provider. The modem or the terminal adapter of the provider is connected to a server as a computer of the provider. The server is connected around-the-clock to the Internet via a router for setting repeating paths. The terminal such as the personal computer is connected to the Internet (Web site) via the server of the provider, by making a call as necessary. Incidentally, the dial-up access is not the only way to connect to the Internet. Some terminals are always connected to the provider by dedicated lines.

Further, the CPU of the host computer may be used instead of the CPU 15 of the image scanning apparatus.

Moreover, the memory and the hard disc of the host computer may be used instead of the RAM 17 of the image scanning apparatus.

Furthermore, in the above-described embodiment, the SCSI interface 10 is used as the interface with the host computer, but the other interfaces (1EEE1394, USB, parallel or the like) may be used.

In the above embodiment, there has been described as an example that the luminous source unit 1 shown in FIG. 1 sequentially emits illumination lights in three colors of R-color, G-color, and B-color, with different peak wavelengths from each other. However, the invention is not limited to this example, for instance, it is applicable to an apparatus using monochrome light. As a major example of an image scanning apparatus using monochrome light, there is a flat head scanner for scanning original documents (reflective documents) which are impenetrable to light. As an example of image scanning apparatus using illumination lights in two colors, there is an apparatus where imperfection in monochrome image (which is formed according to a color dye method) is corrected by infrared light (IR).

Further, in the above embodiment, for an image scanning apparatus using a plurality of monochrome CCD line sensors, a plurality of monochrome line sensors provided in parallel in a sub-scan direction has been described as a way of example. However, the invention is not limited to this example, it may well include an image scanning apparatus having a plurality of CCD line sensors provided in a single line in a main-scan direction. The invention is also applicable to an image scanning apparatus having a configuration that a monochrome CCD line sensor has a shift register unit with a plurality of divided areas, which are taps for output, so as to output image data from the divided areas of the shift register unit through the taps, in cases where the number of pixels in the monochrome CCD line sensor is large, requiring a very long time to output the image data in sequence from the shift register unit.

The invention is not limited to the above embodiments and various modifications may be made without departing from the spirit and the scope of the invention. Any improvement may be made in part or all of the components.

What is claimed is:

1. An image scanning apparatus, comprising:
    an illuminating device for illuminating an original document;
    a driving device for
        relatively transferring said original document and its image scanning position,
        assuming a plurality of areas where the transfer is to be performed at a long pitch, and a plurality of areas where the transfer is to be performed at a short pitch, included in each of the areas where the transfer is to be performed at a long pitch, said pitches being long or short in a sub-scan direction of said original document,
        sub-scanning said original document at least once in said areas where the transfer is to be performed at a short pitch, by performing a small step transferring, and then sub-scanning said original document by performing a large step transferring, the small step transferring being the transfer performed at a short pitch, the large step transferring being the transfer performed at a long pitch, and
        repeating the sub-scanning by performing the large step transferring and the small step transferring; and
    an imaging device having at least two line sensors with equal line intervals on the surface of the imaging device, for outputting a plurality of image data from each of the line sensors, the line sensors receiving light from said original document in a plurality of pixels, the image data representing received light intensity by each of the plurality of pixels.

2. The image scanning apparatus according to claim 1, wherein said driving device only performs said large step transferring.

3. The image scanning apparatus according to claim 1, further comprising:
    an image data combining device for digital-processing discrete image data of at least two lines outputted from said imaging device, and combining the digital-processed image data into data for one image.

4. The image scanning apparatus according to claim 1, wherein:
    said illuminating device comprises a device for performing color separation illumination to separate said original document into two colors or more; and
    said line sensors are monochrome CCD line sensors.

5. A computer-readable storage medium that stores a program for performing a controlling procedure of an image scanning apparatus, the image scanning apparatus comprising:
    an illuminating device for illuminating an original document;
    an original document transferring device for transferring said original document to an image scanning position; and
    an imaging device having at least two line sensors with equal line intervals on the surface of the imaging device, for outputting a plurality of image data from each of the line sensors, the line sensors receiving light from said original document in a plurality of pixels, the image data representing received light intensity by each of the plurality of pixels, and wherein
    said controlling procedure includes:
        assuming a plurality of areas where the transfer is to be performed at a long pitch, in said original document, and a plurality of areas where the transfer is to be performed at a short pitch, included in each of the areas where the transfer is to be performed at a long pitch;
        sub-scanning said original document at least once in said areas where the transfer is to be performed at a short pitch, by performing a small step transferring, and then sub-scanning said original document by performing a large step transferring, the small step transferring being the transfer performed at a short pitch, the large step transferring being the transfer performed at a long pitch; and
        repeating the sub-scanning by performing the large step transferring and the small step transferring.

6. A control program product embodied in a computer-readable data signal for performing a scanning control procedure of an image scanning apparatus comprising:
    an illuminating device for illuminating an original document;
    an original document transferring device for transferring said original document to an image scanning position; and
    an imaging device having at least two line sensors with equal line intervals on the surface of the imaging device, for outputting a plurality of image data from each of the line sensors, the line sensors receiving light from said original document in a plurality of pixels, the image data representing received light intensity by each of the plurality of pixels, and wherein the program product comprises the scanning control procedure of:

assuming a plurality of areas where the transfer is to be performed at a long pitch, in said original document, and a plurality of areas where the transfer is to be performed at a short pitch, included in each of the areas where the transfer is to be performed at a long pitch;

sub-scanning said original document at least once in said areas where the transfer is to be performed at a short pitch, by performing a small step transferring, and then sub-scanning said original document by performing a large step transferring, the small step transferring being the transfer performed at a short pitch, the large step transferring being the transfer performed at a long pitch; and repeating the sub-scanning by alternately performing the large step transferring and the small step transferring.

7. An image scanning apparatus comprising:

an illuminating device for illuminating an original document;

a sub-scan stage for mounting an original document and transferring in a sub-scan direction;

an imaging device having two or more line sensors on the surface of the imaging device, for outputting a plurality of analog image data by the line sensor, the line sensors receiving light from said original document in a plurality of pixels, the image data being in a main-scan direction and representing received light intensity by each of the plurality of pixels;

a driving device for driving said sub-scan stage in a sub-scan direction; and a maximum image data detecting device for obtaining image data by converting analog image data of two or more lines with an A/D converter and obtaining a maximum value of the obtained image data of the two or more lines, the analog image data being output in sequence from the two or more line sensors provided on said image device.

8. The image scanning apparatus according to claim 7, wherein each of said two or more line sensors provided on said image device is constructed so as to divide outputs of said line sensors to be output from a plurality of taps which are provided in each of said line sensors.

9. The image scanning apparatus according to claim 7, further comprising a white balance detecting device for determining white balance, and wherein:

said illuminating device sequentially emits light in one or more color(s) during an initial exposure time which is determined in advance;

said imaging device receives reflective light from a reference white plate or light passing through a transparent window and outputs image data representing received light intensity by each pixel of said two or more line sensors, the reference white plate and the transparent window being provided on said sub-scan stage; and said white balance detecting device determines white balance according to maximum values for each color in the image data.

10. The image scanning apparatus according to claim 9, wherein said white balance detecting device determines an exposure time necessary for obtaining white balance by dividing the maximum output of the A/D converter by the maximum value of the image data and multiplying the resultant by said initial exposure time.

11. The image scanning apparatus according to claim 10, wherein said white balance detecting device calculates shading correction coefficients Snm for each color by dividing each of the A/D converted image data by the maximum value of the image data and obtaining shading correction coefficients Snm by each pixel of two or more line sensors, n of the Snm denoting a line sensor number, m denoting a pixel number, and both n and m being positive integers.

12. A computer-readable storage medium that stores a program for performing a controlling procedure of an image scanning apparatus, the image scanning apparatus comprising:

an illuminating device for illuminating an original document;

a sub-scan stage for mounting an original document and transferring in a sub-scan direction;

an imaging device having two or more line sensors on the surface of the imaging device, for outputting a plurality of analog image data by the line sensor, the line sensors receiving light from said original document in a plurality of pixels, the image data being in a main-scan direction and representing received light intensity by each of the plurality of pixels;

a driving device for driving said sub-scan stage in a sub-scan direction; and a maximum image data detecting device for obtaining image data by converting analog image data of two or more lines with an A/D converter and obtaining a maximum value of the obtained image data of the two or more lines, the analog image data being output in sequence from the two or more line sensors provided on said image device; and a white balance detecting device for determining white balance, and wherein said controlling procedure includes:

sequentially emitting light in one or more color(s) during an initial exposure time which is determined in advance;

receiving reflective light from a reference white plate or light passing through a transparent window and outputting image data representing received light intensity by each pixel of said two or more line sensors, the reference white plate and the transparent window being provided on said sub-scan stage; and determining white balance according to maximum outputs for each color in the image data.

13. The computer-readable storage medium according to claim 12, wherein said controlling procedure includes determining an exposure time necessary for obtaining white balance by dividing a maximum output of the A/D converter by the maximum value of the image data and multiplying the resultant by said initial exposure time.

14. The computer-readable storage medium according to claim 13, wherein said controlling procedure includes determining shading correction coefficients Snm by each pixel of two or more line sensors by dividing the maximum output of the A/D converter by the exposure time necessary for obtaining white balance, n of the Snm denoting a line sensor number, m denoting a pixel number, and both n and m being positive integers.

15. The computer-readable storage medium according to claim 12, wherein said controlling procedure includes calculating shading correction coefficients Snm for each color by dividing shading correction coefficients Snm by each pixel of two or more line sensors by the maximum value of the image data, n of the Snm denoting a line sensor number, m denoting a pixel number, and both n and m being positive integers.

16. A control program product embodied in a computer-readable data signal for performing control procedures of an image scanning apparatus comprising:

an illuminating device for illuminating an original document;

a sub-scan stage for mounting an original document and transferring in a sub-scan direction;

an imaging device having two or more line sensors on the surface of the imaging device, for outputting a plurality of analog image data by the line sensor, the line sensors receiving light from said original document in a plurality of pixels, the image data being in a main-scan direction and representing received light intensity by each of the plurality of pixels;

a driving device for driving said sub-scan stage in a sub-scan direction; and a maximum image data detecting device for obtaining image data by converting analog image data of two or more lines with an A/D converter and obtaining a maximum output of the obtained image data, the analog image data being output in sequence from the two or more line sensors provided on said image device; and a white balance detecting device for determining white balance, and wherein said procedures comprise:

sequentially emitting light in one or more color(s) during an initial exposure time which is determined in advance;

receiving reflective light from a reference white plate or light passing through a transparent window, and outputting image data representing received light intensity by each pixel of said two or more line sensors, the reference white plate and the transparent window being provided on said sub-scan stage; and determining white balance according to maximum outputs for each color in the image data.

17. The control program product embodied in a computer-readable data signal according to claim 16, wherein the procedures further comprise a procedure of determining an exposure time necessary for obtaining white balance by dividing the maximum output of the A/D converter by the maximum image data and multiplying the resultant by the initial exposure time.

18. The control program product embodied in a computer-readable data signal according to claim 17, wherein the procedures further comprise a procedure of obtaining shading correction coefficients Snm by each pixel of two or more line sensors by dividing the maximum output of the A/D converter by the exposure time necessary for obtaining white balance, n of the Snm denoting a line sensor number, m denoting a pixel number, and both n and m being positive integers.

19. The control program product embodied in a computer-readable data signal according to claim 18, wherein the procedures further comprise a procedure of calculating shading correction coefficients Snm for each color by dividing shading correction coefficients Snm by each pixel of two or more line sensors by a maximum value of the image data.

* * * * *